United States Patent
Makino (10) Patent No.: US 9,936,159 B2
(45) Date of Patent: Apr. 3, 2018

(54) DISPLAY CONTROL DEVICE FOR DISPLAYING AN IMAGE BASED ON IMAGE SIGNALS

(71) Applicant: CASIO COMPUTER CO., LTD., Shibuya-ku, Tokyo (JP)

(72) Inventor: Tomoya Makino, Mitaka (JP)

(73) Assignee: Casio Computer Co., Ltd., Tokyo (JP)

( * ) Notice: Subject to any disclaimer, the term of this patent is extended or adjusted under 35 U.S.C. 154(b) by 0 days.

(21) Appl. No.: 15/391,752

(22) Filed: Dec. 27, 2016

(65) Prior Publication Data

US 2017/0289497 A1   Oct. 5, 2017

(30) Foreign Application Priority Data

Mar. 31, 2016 (JP) .................. 2016-070541

(51) Int. Cl.
*H04N 7/01* (2006.01)
*H04N 5/04* (2006.01)
*H04N 9/31* (2006.01)

(52) U.S. Cl.
CPC ............ *H04N 7/0117* (2013.01); *H04N 5/04* (2013.01); *H04N 9/312* (2013.01); *H04N 9/3135* (2013.01)

(58) Field of Classification Search
CPC .................................................. H04N 7/0105
USPC ................. 348/449, 448, 458, 459
See application file for complete search history.

(56) References Cited

U.S. PATENT DOCUMENTS

| 4,660,156 A * | 4/1987 | Guttag .................. G09G 5/001 345/534 |
| 8,401,359 B2 * | 3/2013 | Shoji ..................... G09G 5/006 341/50 |
| 2005/0141783 A1 * | 6/2005 | Chen ..................... G09G 5/006 382/286 |
| 2010/0103077 A1 * | 4/2010 | Sugiyama ........... G02B 27/017 345/8 |
| 2012/0200832 A1 * | 8/2012 | Imai ........................ G02B 3/08 353/20 |
| 2014/0307230 A1 * | 10/2014 | Hajjar .................. H04N 9/3129 353/30 |
| 2016/0246409 A1 * | 8/2016 | Yang ..................... G06F 3/0412 |

FOREIGN PATENT DOCUMENTS

JP    11282443 A    10/1999

* cited by examiner

*Primary Examiner* — Paulos M Natnael
(74) *Attorney, Agent, or Firm* — Holtz, Holtz & Volek PC (57) ABSTRACT

A display control device includes: a receiver configured to receive an image signal; a measurer configured to measure the number of vertical scanning lines and horizontal scanning time of the image signal; a table generator configured to generate a provisional signal table when data measured by the measurer has not been retained in a previously prepared signal table; a detector configured to detect data for regulating an active display region of an image, from the image signal; and an updater configured to update the provisional signal table, based on a detection result by the detector.

15 Claims, 10 Drawing Sheets

| No. | STANDARD | V-Total Line | H-Total Time (ns) | Active Left Pixel | Active Right Pixel | Active Top Line | Active Bottom Line | ADC-Sample Clock |
|---|---|---|---|---|---|---|---|---|
| 1 | 640×350/85 | 445 | 26413 | 158 | 797 | 63 | 412 | 832 |
| 2 | 640×400/85 | 445 | 26413 | 160 | 799 | 44 | 443 | 832 |
| 3 | 720×400/85 | 446 | 26366 | 178 | 897 | 45 | 444 | 936 |
| 4 | 640×480/60 | 525 | 31778 | 134 | 773 | 27 | 506 | 900 |
| ⋮ | ⋮ | ⋮ | ⋮ | ⋮ | ⋮ | ⋮ | ⋮ | ⋮ |
| 13 | 1024×768/60 | 806 | 20677 | 297 | 1320 | 35 | 802 | 1344 |
| 14 | 1024×768/70 | 806 | 17707 | 279 | 1302 | 35 | 802 | 1328 |
| 15 | 1024×768/75 | 800 | 16660 | 270 | 1293 | 31 | 798 | 1312 |
| 16 | 1024×768/85 | 808 | 14561 | 302 | 1325 | 39 | 806 | 1376 |
| 17 | 1152×864/75 | 900 | 14815 | 382 | 1533 | 35 | 898 | 1600 |
| 18 | 1280×960/60 | 1000 | 16667 | 422 | 1701 | 39 | 998 | 1800 |
| 19 | 1280×960/85 | 10 11 | 1636 | 382 | 1661 | 41 | 1000 | 1728 |
| 20 | 1280×1024/60 | 1066 | 15630 | 361 | 1640 | 41 | 1064 | 1688 |
| 21 | 1280×1024/75 | 1066 | 12504 | 390 | 1669 | 41 | 1064 | 1688 |
| 22 | 1280×1024/85 | 1072 | 10971 | 382 | 1661 | 47 | 1070 | 1728 |
| 23 | 1600×1200/60 | 1250 | 13333 | 494 | 2093 | 49 | 1248 | 2160 |
| 24 | 1400×1050/60 | 1089 | 15310 | 376 | 1775 | 36 | 1085 | 1864 |
| 25 | 1280×768/60 | 798 | 20931 | 320 | 1599 | 26 | 793 | 1664 |
| 26 | 1280×800/60 | 831 | 20120 | 328 | 1607 | 28 | 827 | 1680 |
| 27 | 1440×900/60 | 934 | 17878 | 394 | 1823 | 31 | 930 | 1804 |
| 28 | 1680×1050/60 | 1089 | 15316 | 456 | 2135 | 36 | 1085 | 2240 |
| 29 | 1366×768/60 | 798 | 20959 | 356 | 1721 | 27 | 794 | 1792 |
| 30 | 1280×720/60 | 750 | 22222 | 261 | 1540 | 25 | 744 | 1650 |
| 31 | 1920×1080/60 | 1125 | 14815 | 193 | 2112 | 41 | 1120 | 2200 |
| 32 | 1920×1080/60 | 1235 | 13507 | 113 | 2032 | 32 | 1231 | 2080 |

| V-Total Line | H-Total Time (ns) | Active Left Pixel | Active Right Pixel | Active Top Line | Active Bottom Line | ADC-Sample Clock |
|---|---|---|---|---|---|---|
| 0 | 0 | 0 | 0 | 0 | 0 | 0 |

DISPLAY CONTROL DEVICE FOR DISPLAYING AN IMAGE BASED ON IMAGE SIGNALS

BACKGROUND OF THE INVENTION

The present invention relates to a display control device.

A two-dimensional display device, such as a liquid crystal display or a projector, (hereinafter, simply referred to as a display device) is used for displaying various image signals output from a video source of, for example, a personal computer, a video tape recorder (VTR), or digital versatile disc (DVD) player.

There are various types of image signals to be input to the display device, based on different types of resolution Examples of the image signals include video graphics array (VGA), super VGA (SVGA), extended graphics array (XGA), wide XGA (WXGA), super XGA (SXGA), and SXGA+, that have been standardized (hereinafter, referred to as a standard signal). A large number of display devices support these standard signals (for example, refer to JP 11-282443 A).

However, there is a video source that outputs a non-standard image signal (hereinafter, referred to as a non-standard signal). The display devices cannot display such non-standard image signal.

Therefore, an object of the present invention is to provide a display control device capable of displaying even a non-standard image signal (a non-standard signal).

SUMMARY OF THE INVENTION

A display control device according to the present invention includes: a receiver configured to receive an image signal; a measurer configured to measure the number of vertical scanning lines and horizontal scanning time of the image signal; a table generator configured to generate a provisional signal table when data measured by the measurer has not been retained in a previously prepared signal table; a detector configured to detect data for regulating an active display region of an image, from the image signal; and an updater configured to update the provisional signal table, based on a detection result by the detector.

DETAILED DESCRIPTION OF THE PREFERRED EMBODIMENTS

An embodiment of the present invention that has been applied to a projector as an example (also referred as an image projection device), will be described with reference to the drawings.

Figure 1:
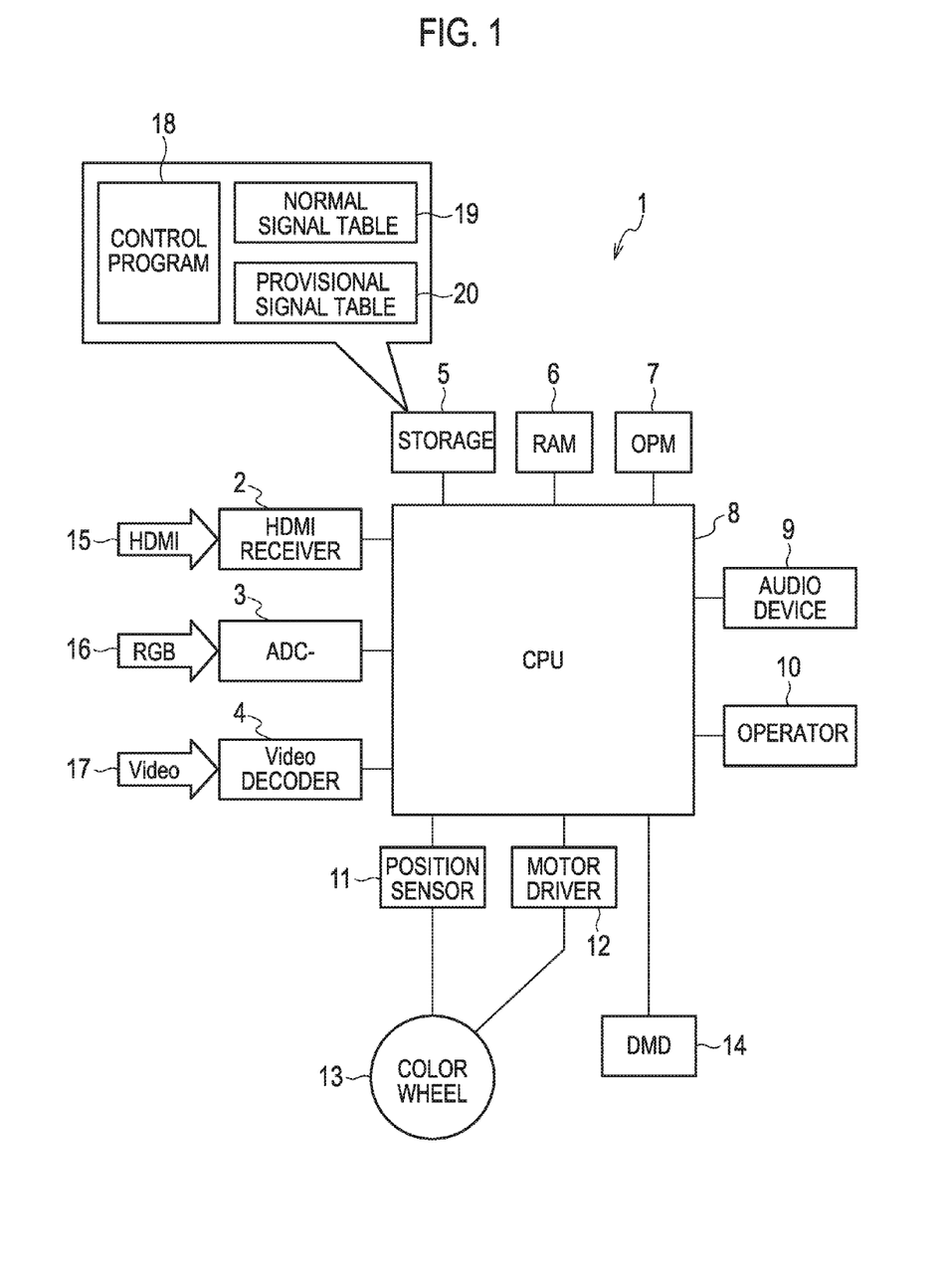
FIG. 1 is a conceptual diagram of a configuration of a projector.

FIG. 1 is a conceptual diagram of a configuration of the projector.

In the figure, the projector 1 includes, for example, a high-definition multimedia interface (HDMI) (registered trademark) receiver 2, an analog to digital converter (ADC) 3, a video decoder 4, a storage 5, a random access memory (RAM) 6, an optical module (OPM) 7, a CPU 8, an audio device 9, an operator 10, a position sensor 11, a motor driver 12, a color wheel 13, and a digital mirror device (DMD) 14.

The HDMI (registered trademark) receiver 2 acquires an HDMI (registered trademark) signal 15 (an HDMI (registered trademark) standard image signal). The ADC 3 acquires an RGB signal 16 (an image signal including three primary colors). The video decoder 4 acquires a video signal 17 (an image signal including, for example, a synchronizing signal). The HDMI (registered trademark) receiver 2, the ADC 3 and the video decoder 4 generate various signals necessary for video projection (for example, a vertical synchronizing signal, a horizontal synchronizing signal, a video signal, and a dot clock) from the acquired image signals, and then output the various signals to the CPU 8.

The storage 5 is a storage component that retains various data necessary for operation of the CPU 8. In a case where the CPU 8 includes a control component in a program control system (hardware mainly including a microcomputer), one of the various data is a control program 18 (software operated by the microcomputer) for regulating operation of the control component. Another of the various data is a signal table 19 for a standard signal, supporting the type of an image signal. A still another is a provisional signal table 20 that is temporarily used in a case where a non-standard image signal (a non-standard signal) is input. In order to distinguish the two signal tables 19 and 20 below, the first signal table 19 is referred to as a "normal signal table 19" and the second signal table 20 is referred to as a "provisional signal table 20" for convenience. The detailed descriptions of the normal signal table 19 and the provisional signal table 20 will be given later.

The RAM 6 functions as a work area of the CPU 8. The OPM 7 controls an electric zoom and focus of the projector 1.

The CPU 8 is the control component that collectively controls operation of the projector 1. The audio device 9 is an acoustic component, such as a speaker, that plays back and outputs audio data output from the CPU 8. The operator 10 is a user interface component, such as a button or a touch panel, that receives an input operation of a user with respect to the projector 1.

The color wheel 13 is a rotational disk including a red filter, a blue filter, and a green filter, formed integrally. The motor driver 12 rotates and drives the color wheel 13. The position sensor 11 detects the rotation angle of the color wheel 13.

The DMD 14 is a display element including a large number of minute mirrors (movable micromirrors) arranged on a plane. An electrode provided to a lower portion of each of the mirrors is driven so that each of the micromirrors can have two states including "ON" and "OFF" and an arbitrary angle state therebetween. When the mirrors are in the state of "ON", light from an internal light source not illustrated is reflected to the outside so as to be projected on a screen not illustrated. When the mirrors are in the state of "OFF", the light is reflected to an internal absorber so as not to be projected to the outside. When an arbitrary angle is provided, the light having intensity corresponding to the angle is reflected. Accordingly, each of the micromirrors is individually driven so that the projection of the light can be controlled for each display pixel.

The detailed descriptions of the normal signal table 19 and the provisional signal table 20 will be given.

Figure 2:
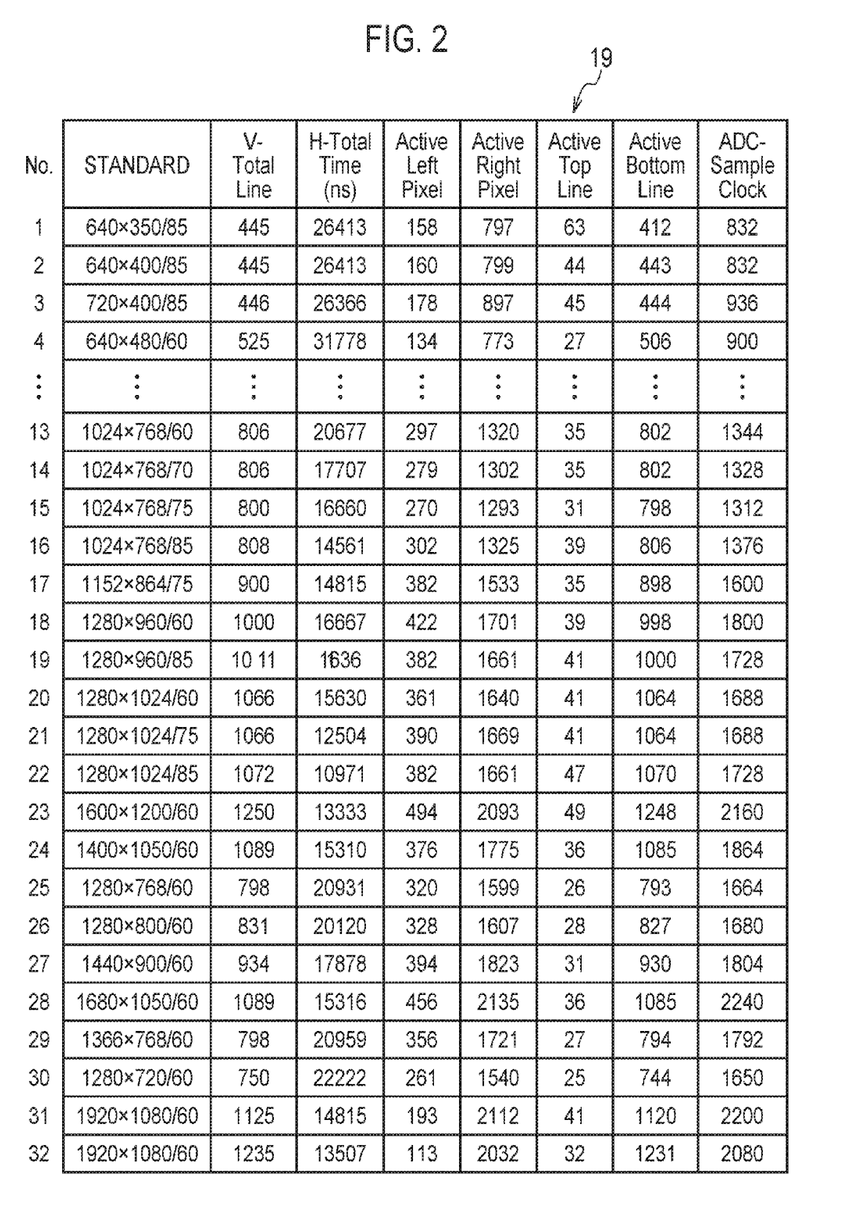
FIG. 2 is a table of a configuration of a normal signal table.

FIG. 2 is a table of a configuration of the normal signal table 19. Note that, the illustrated normal signal table 19 supports the standard signal including 32 types of standards from No. 1 to No. 32. The standards are merely exemplary. Only typical standards may be included, or other standards may be included.

Here, the notation of the standards is arranged in a format of (the number of horizontal pixels)×(the number of vertical pixels)/(frame frequency). For example, a standard of No. 1 has a number of horizontal pixels of 640 (pixels), a number of vertical pixels of 350 (pixels), and a frame frequency of 85 (Hz).

A record of the normal signal table 19 includes at least seven fields. Designations and meanings of the respective fields are as follows:

V-Total Line: the number of horizontal scanning lines

H-Total Time (ns): horizontal scanning time

Active Left Pixel: the left end pixel number in an active display region

Active Right Pixel: the right end pixel number in the active display region

Figure 3A:
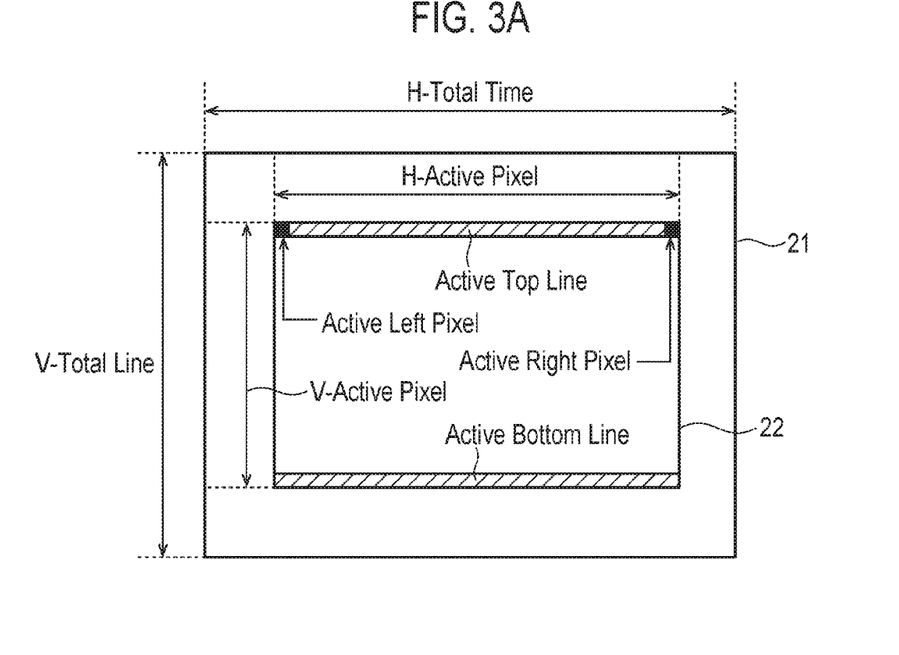
FIG. 3A is a view of an exemplary display of a standard signal.
Figure 3B:
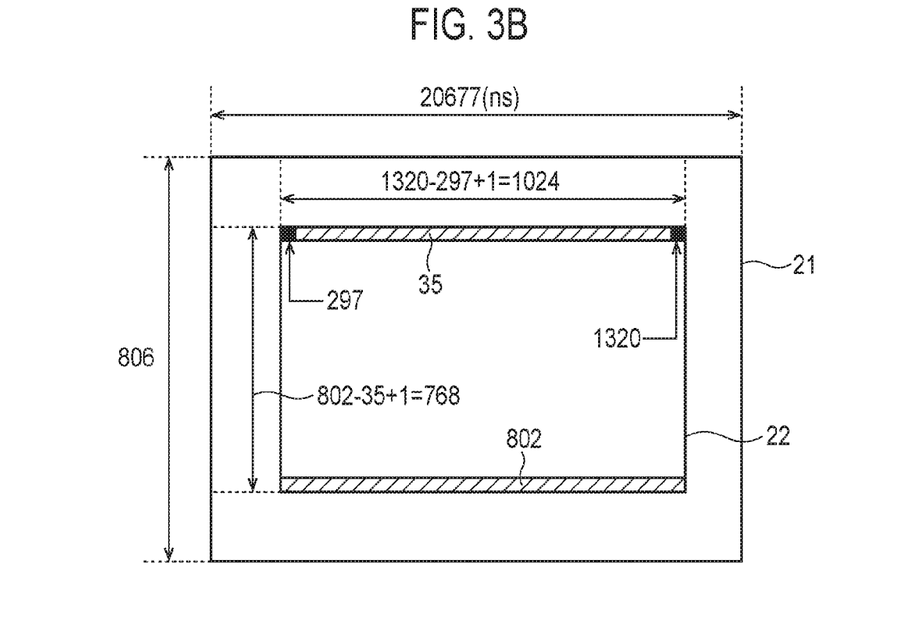
FIG. 3B is a view of another exemplary display of the standard signal.

Active Top Line: the upper end scanning line number in the active display region Active Bottom Line: the lower end scanning line number in the active display region ADC-Sample Clock: the sampling clock number FIGS. 3A and 3B each illustrate an exemplary display of the standard signal. In FIG. 3A, the short-side length (height) of an outer oblong rectangle 21 corresponds to V-Total Line and the long-side length (width) corresponds to H-Total Time (ns). An oblong rectangle positioned inside the oblong rectangle 21 indicates an active display region 22 of an image (also referred to as an active area).

A left end of the active display region 22 is indicated with Active Left Pixel, and a right end is indicated with Active Right Pixel. Furthermore, an upper end of the active display region 22 is indicated with Active Top Line, and a lower end is indicated with Active Bottom Line.

For example, when No. 13 in the standard signal in FIG. 2 is exemplified in FIG. 3B, the following expressions are satisfied.

$V$-TotalLine=806

$H$-TotalTime(ns)=20677

ActiveLeftPixel=297

ActiveRightPixel=1320

ActiveTopLine=35

ActiveBottomLine=802

Therefore, the short-side length (height: V-Active Pixel) and the long-side length (width: H-Active Pixel) of the active display region 22 are individually acquired as follows:

$V$-ActivePixel=802−35+1=768

$H$-Active Pixel=1320−297+1=1024

Figure 4:
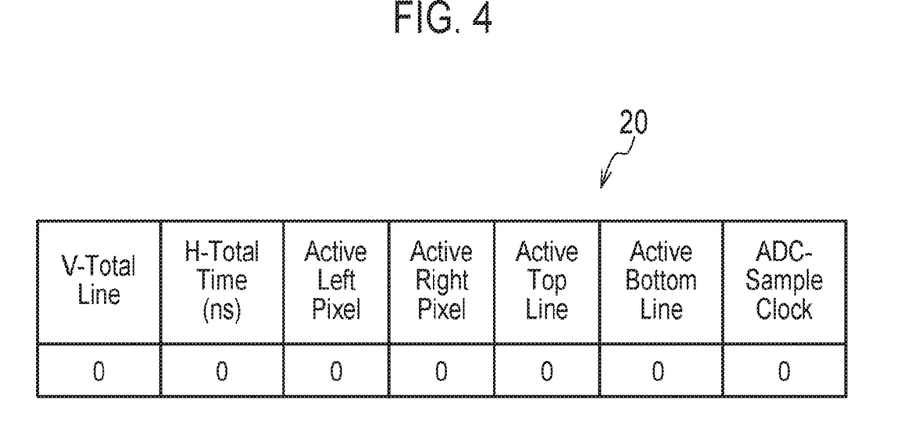
FIG. 4 is a table of a configuration of a provisional signal table.

FIG. 4 is a table of a configuration of the provisional signal table 20. The provisional signal table 20 also includes a record having at least seven fields with designations the same as those of the above normal signal table 19. One record is provided, and provisional values (for example, "0") are stored in the respective fields, differently from the above normal signal table 19. The provisional signal table 20 is used when the non-standard image signal (the non-standard signal) is input to the projector 1.

Figure 5:
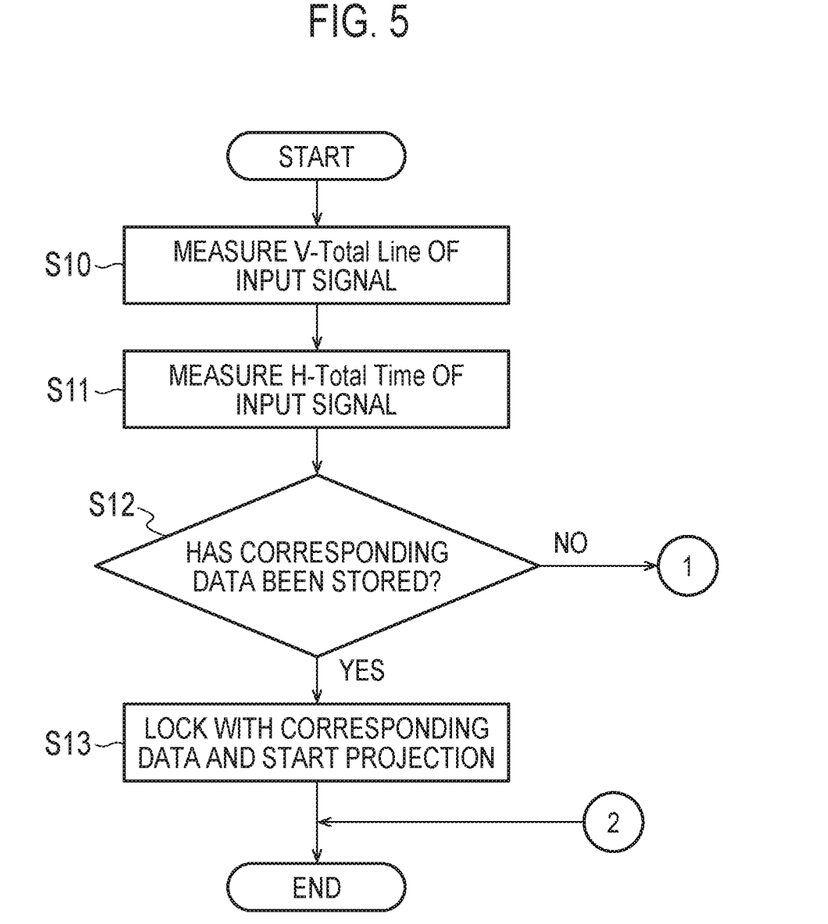
FIG. 5 is a partial flow chart of schematic operation of the projector.
Figure 6:
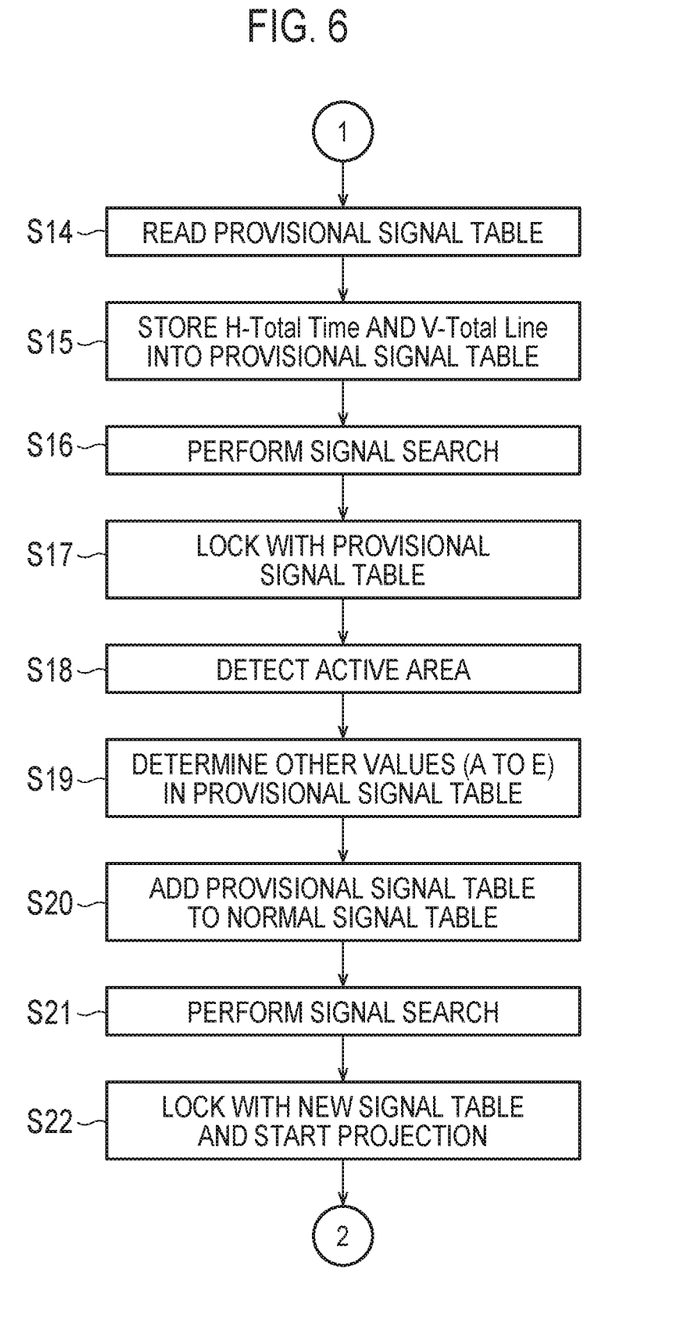
FIG. 6 is a remaining flow chart of the schematic operation of the project.

FIGS. 5 and 6 are flow charts of schematic operation of the projector 1.

In FIG. 5, the CPU 8 first measures V-Total Line and H-Total Time of an input image signal (step S10 and step S11). As described above, V-Total Line is the number of vertical scanning lines and H-Total Time is the horizontal scanning time. Thus, V-Total Line is given with the "number" of horizontal synchronizing signals during a period of from a first vertical synchronizing signal continuously to a second vertical synchronizing signal. H-Total Time is given with "time" of from a first horizontal synchronizing signal continuously to a second horizontal synchronizing signal.

Next, the CPU 8 determines whether data having values equivalent to the measured V-Total Line and H-Total Time has been stored in the normal signal table 19 (step S12).

For example, in a case where the measured V-Total Line and H-Total Time are "445" and "26413", respectively, since data having values equivalent to these values has been stored in No. 1 in the normal signal table 19, the CPU 8 determines to use data of No. 1. The CPU 8 refers to, as numerical values to be used for setting of the active area, each value in the table data of No. 1 that has been determined to be used, and performs the setting so as to perform projection (step S13).

Meanwhile, in a case where the determination result at step S12 is NO, namely, in a case where data having values equivalent to the measured V-Total Line and H-Total Time has not stored in the normal signal table 19, the processing branches to processing in FIG. 6. The measured V-Total Line and H-Total Time are assumed to be "806" and "20500", respectively, for the convenience of the descriptions, below.

In FIG. 6, after reading the provisional signal table 20 from the storage 5 (step S14), the CPU 8 writes values of the measured V-Total Line and H-Total Time into the provisional signal table 20 (step S15).

In this case, the other values in the provisional signal table 20 (values except V-Total Line and H-Total Time) adopt, as provisional values, close data in the normal signal table 19. Now, No. 13 in the normal signal table 19 is closest to "806" for V-Total Line and "20500" for H-Total Time. Therefore, the CPU 8 provisionally adopts and writes data of No. 13 as the other values (Active Left Pixel, Active Right Pixel, Active Top Line, Active Bottom Line, and ADC-Sample Clock), into the provisional signal table 20 (a table generating means). Note that, for a method of selecting the closest data from the normal signal table 19, it is thought that table data closest to the numerical value of any predetermined one of V-Total Line and H-Total Time, is selected. It is also thought that, for example, the sum of the numerical values of the measured V-Total Line and H-Total Time and the sum of V-Total Line and H-Total Time in each table data in the normal signal table 19, are compared and then table data having the smallest difference is selected.

Next, in a case where detecting whether the input signal is present and then detecting that the signal is present, the CPU 8 performs a signal search, namely, processing of identifying what type of the signal is (step S16).

Next, the CPU 8 determines the respective values in the provisional signal table 20 to be the numerical values to be used for the setting of the active area, and refers to the respective values in the provisional signal table 20 (step S17) so as to detect the active area (the active display region 22) (step S18).

The CPU 8 detects each data of the active area, namely, Active Left Pixel (the left end pixel number in an active display region), Active Right Pixel (the right end pixel number in the active display region), Active Top Line (the upper end scanning line number in the active display region), and Active Bottom Line (the lower end scanning line number in the active display region). Note that, a method of detecting each of the pieces of data, will be described later. The CPU 8 refers to the values in the provisional signal table 20 so as to determine ADC-Sample Clock (the sampling clock number) (step S19), updates the provisional signal table 20, and additionally adds the provisional signal table 20 after the update to the normal signal table 19 (step S20).

Next, the CPU 8 searches the signal (step S21), and sets each value in a new signal table (the provisional signal table 20) to the numerical values to be used for the setting of the active area, so as to perform projection (step S22).

Figure 7A:
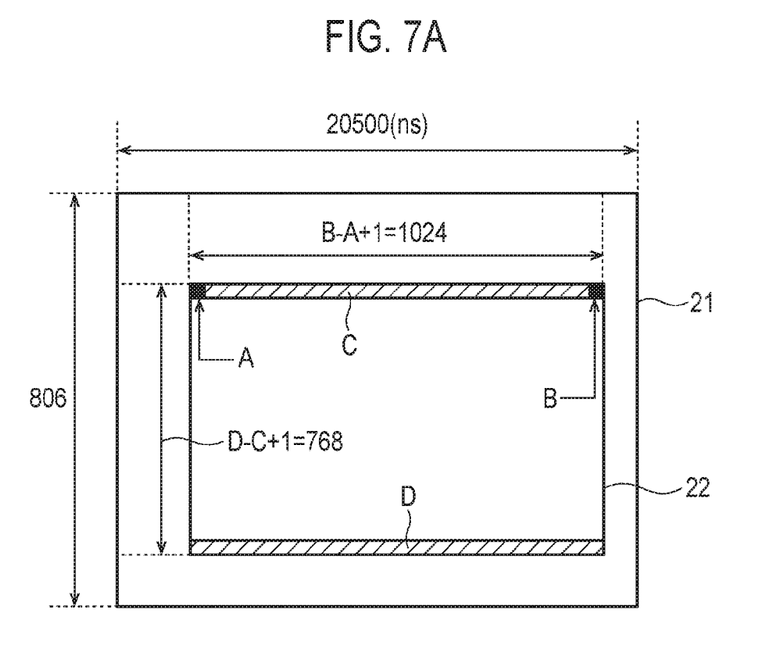
FIG. 7A is an exemplary view for describing a non-standard signal.
Figure 7B:
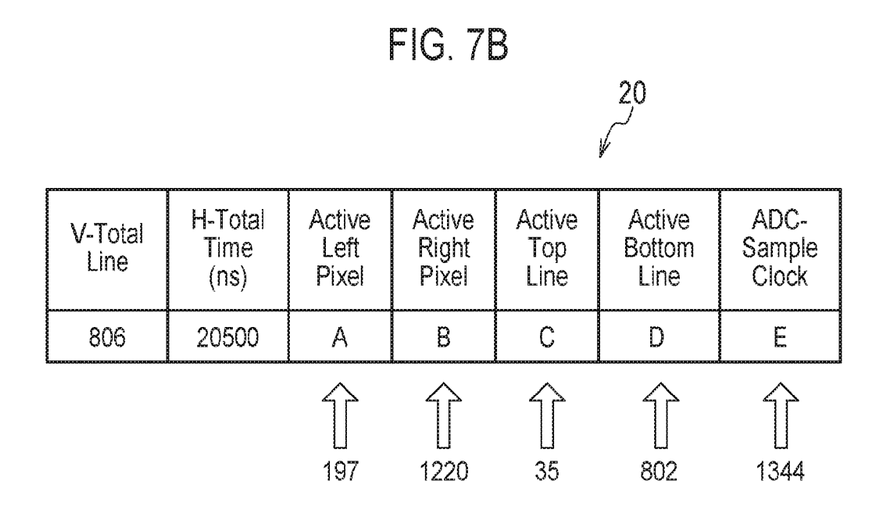
FIG. 7B is an exemplary table for describing the non-standard signal.

FIGS. 7A and 7B are exemplary view and exemplary table for describing the non-standard signal. In the figure and the table, data having values equivalent to "806" for V-Total Line and "20500" for H-Total Time has not been stored in the normal signal table 19. The closest data is No. 13. The method of selecting the closest data has been described above.

Therefore, in this case, "806" and "20500" are stored in V-Total Line and H-Total Time in the provisional signal table 20, respectively. In addition, the data of No. 13 in the normal signal table 19 ("297", "1320", "35", "802", and "1344") is provisionally stored in the other values (A to E).

In some cases, the data of No. 13 in the normal signal table 19 stored in the provisional signal table 20 is different from actual numerical values of the input signal. However, the data in the normal signal table 19 having values close to V-Total Line and H-Total Time of the input signal, has numerical values close to the numerical values of the input signal in terms of the other values.

In this case, the actual value of ADC-Sample Clock included in the input signal and the value of ADC-Sample Clock in the provisional signal table 20 are different from each other in some cases. Even when the difference occurs, a close numerical value is provided. Therefore, a circumferential portion of image data that has been input, is barely shifted. Accordingly, influence on projection content is small.

The provisional signal table 20 is generated and then a candidate close to a value retained in the provisional signal table 20 is selected in a case where a candidate value to be an end is detected from a plurality of portions due to, for example, noise of the input signal, during the detection of the active display region 22, so that the active display region 22 close to a more accurate numerical value can be detected.

After the generation of the provisional signal table 20, detection of the values included in the input signal is performed. Then, the respective values of the provisional signal table 20 are updated with the actual measured values. Here, in a case where the image data indicated with the input signal is provisionally a totally black image, or in a case where the circumferential portion of the image is black, all RGB values become zero so that the detection of the active area cannot accurately be performed. In this case, as described above, using the numerical values in the provisional signal table 20 remaining for the setting of the projection, can perform the projection having a small shift.

Figure 8A:
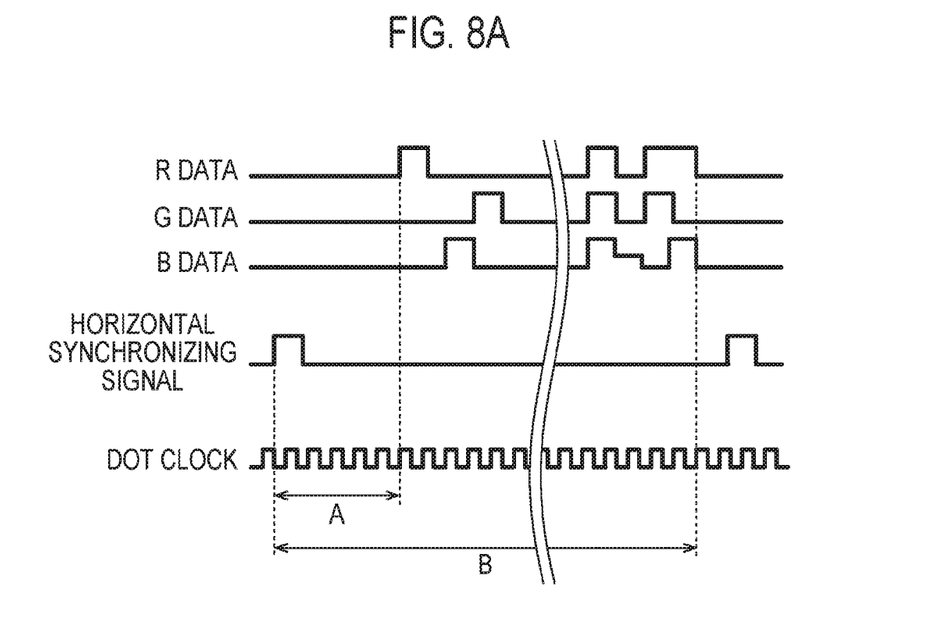
FIG. 8A is a conceptual waveform chart of detection of an active area in a horizontal direction.
Figure 8B:
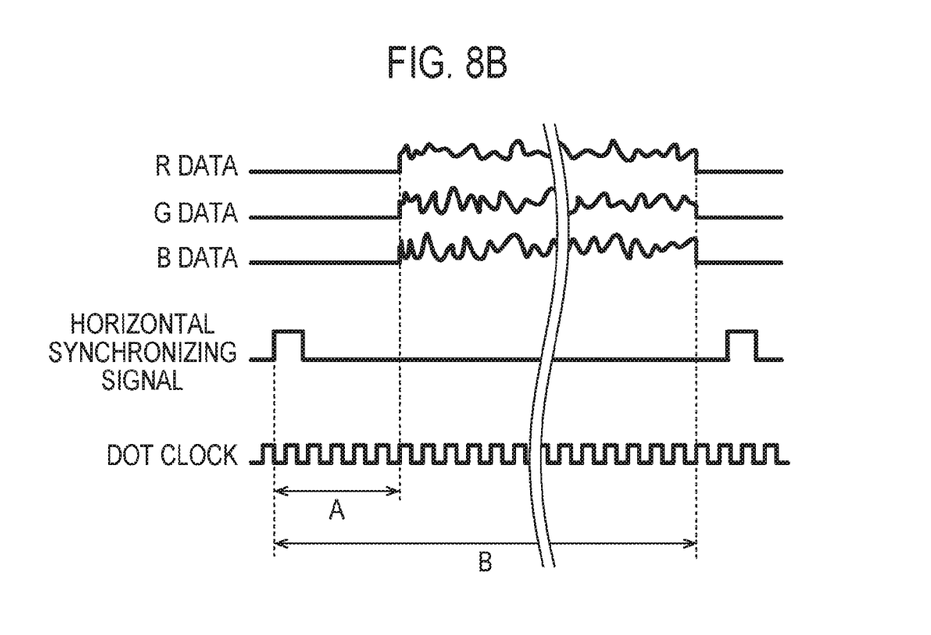
FIG. 8B is another conceptual waveform chart of the detection of the active area in the horizontal direction.

FIGS. 8A and 8B are conceptual waveform charts of detection of the active area in a horizontal direction. Note that, FIG. 8A illustrates an exemplary image signal including brightness and darkness clearly distinguished similarly to color bars for inspection. FIG. 8B illustrates an exemplary image signal including brightness and darkness subtly varying similarly to a personal computer. Detection for the respective values to be described below can be performed by using ADC-Sample Clock designated in the provisional signal table 20. For example, in a case where the value of ADC-Sample Clock designated in the provisional signal table 20 is 1344, 1344 dot clocks are present during a period of from a rise of a horizontal synchronizing signal in FIGS. 8A and 8B to a next rise of the horizontal synchronizing signal.

Here, the value of ADC-Sample Clock is divided by the value of H-Total Time in order to update the respective values in the provisional signal table 20 to the actual measured values of the input signal. Accordingly, cycle time for one dot clock is calculated. The calculated cycle time for one dot clock is used so that the values of Active Left Pixel, Active Right Pixel, Active Top Line, and Active Bottom Line can be calculated from the input signal. A method of calculating each of the above values, will be described below.

A being one of the other values, namely, Active Left Pixel (the left end pixel number in an active display region) is calculated based on the number of dot clocks during a period from the horizontal synchronizing signal to first image data (R, G, and B data).

B being another of the other values, namely, Active Right Pixel (the right end pixel number in the active display region) is calculated based on the number of dot clocks during a period from the horizontal synchronizing signal to last image data (the R, G, and B data).

Figure 9:
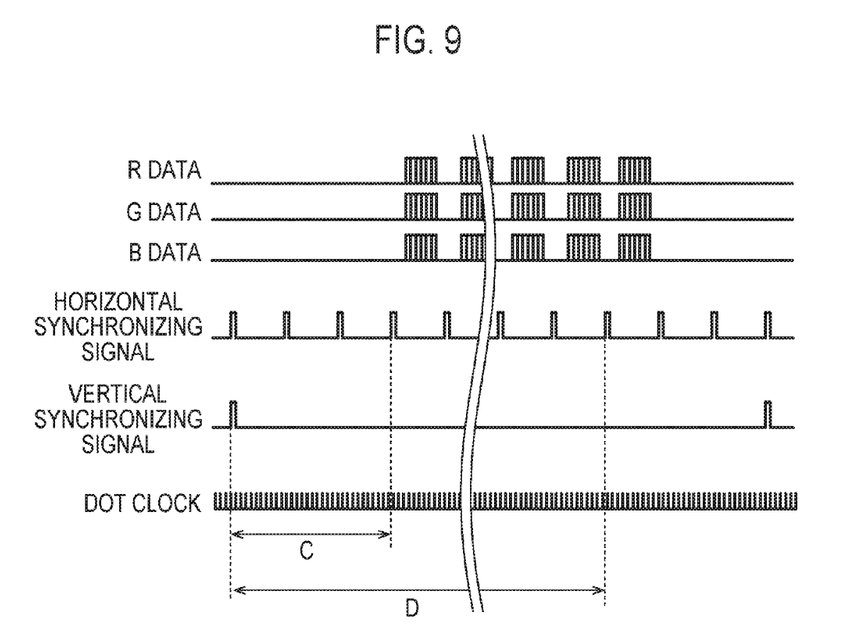
FIG. 9 is a conceptual waveform chart of detection of the active area in a vertical direction.

FIG. 9 is a conceptual waveform chart of detection of the active area in a vertical direction.

C being still another of the other values, namely, Active Top Line (the upper end scanning line number in the active display region) is calculated based on the number of dot clocks during a period from a vertical synchronizing signal to a horizontal synchronizing period including the first image data (the R, G, and B data).

D being still another of the other values, namely, Active Bottom Line (the lower end scanning line number in the active display region) is calculated based on the number of dot clocks during a period from the vertical synchronizing signal to a horizontal synchronizing period including the last image data (the R, G, and B data).

In this manner, determining V-Total Line and H-Total Time and additionally the other values of A to E in the provisional signal table 20 and performing the setting of the active display region 22 with the provisional signal table 20, can project an image of the non-standard signal without any trouble.

That is, as illustrated in FIG. 7A, the image satisfying the following expressions can be displayed (projected).

$V$-TotalLine=806

$H$-TotalTime(ns)=20500

ActiveLeftPixel=197

ActiveRightPixel=1220

ActiveTopLine=35

ActiveBottomLine=802

ADC-Sample Clock=1344

Figure 10A:
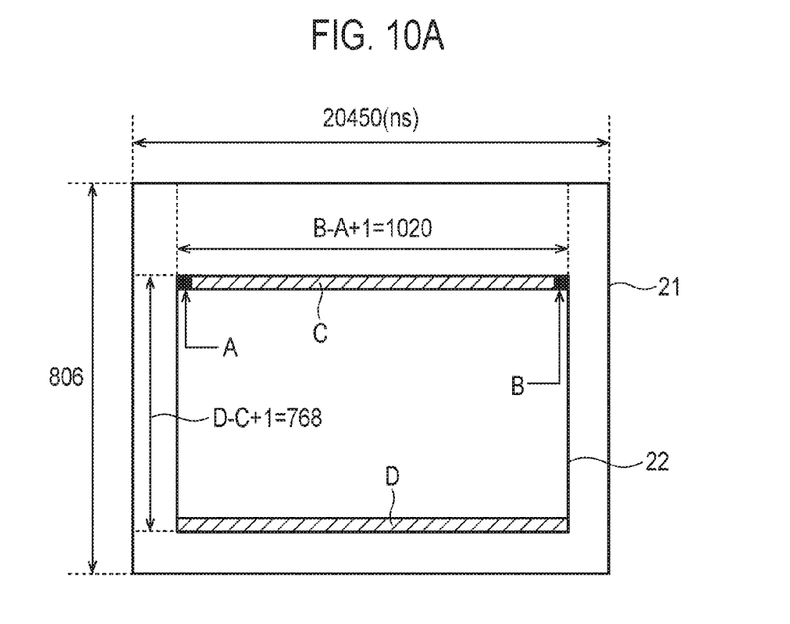
FIG. 10A is another exemplary view for describing the non-standard signal.
Figure 10B:
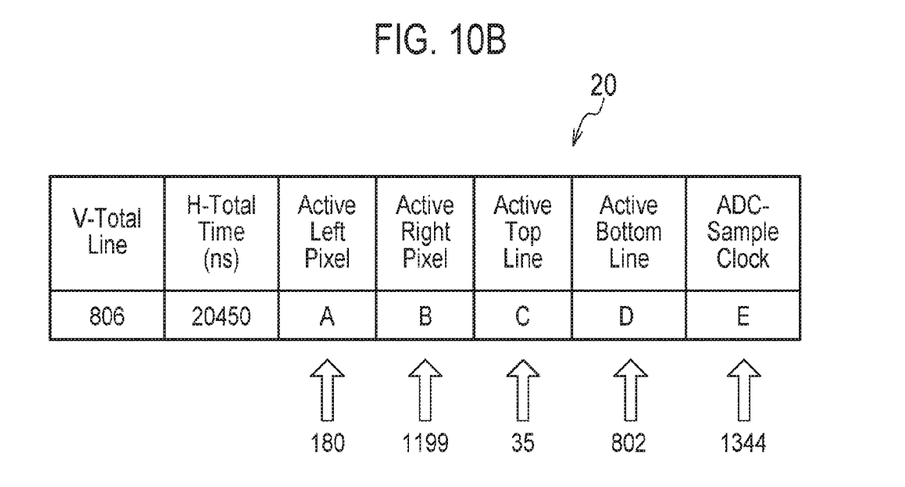
FIG. 10B is another exemplary table for describing the non-standard signal.

FIGS. 10A and 10B are another exemplary view and another exemplary table for describing the non-standard signal. In the figure and the table, data having values equivalent to "806" for V-Total Line and "20450" for H-Total Time has not been stored in the normal signal table 19. The closest data is No. 13. The method of selecting the closest data has been described above.

In a case where this type of non-standard signal is used, as illustrated in FIG. 10A, an image satisfying the following expressions can be displayed (projected).

$V$-TotalLine=806

$H$-TotalTime(ns)=20450

ActiveLeftPixel=180

ActiveRightPixel=1199

ActiveTopLine=35

ActiveBottomLine=802

ADC-Sample Clock=1344

Note that, the application to the projector 1 has been exemplified in the above descriptions. However, the embodiment of the present invention is not limited to this. Application can be made to a display device that at least displays image signals including various standards, or a display control device at least used for the display device.

What is claimed is:

1. A display control device comprising:
a hardware processor configured to:
    receive an image signal;
    acquire a feature of the image signal;
    generate a provisional signal table record in a case in which the acquired feature of the image signal is not stored in a record of a previously prepared signal table;
    detect data for regulating an active display region of an image, from the image signal; and
    update the provisional signal table record, based on the data which has been detected,
wherein:
    the signal table is stored in a memory, each record of the signal table containing various data including data for regulating an active display region of an image of an image signal to which the record corresponds,
    each record of the signal table includes at least seven elements, and
    the signal table stores at least one record having a set of elements including at least a number of vertical scanning lines, a horizontal scanning time, a left end pixel number, a right end pixel number, an upper end scanning line number, a lower end scanning line number, and clock information.

2. The display control device according to claim 1, wherein the hardware processor is configured to detect the data for regulating the active display region of the image, from the image signal, based on the clock information and a horizontal scanning time of the image signal.

3. The display control device according to claim 1, wherein the hardware processor is configured to generate the provisional signal table record, based on a number of vertical scanning lines and a horizontal scanning time of the image signal.

4. The display control device according to claim 1, wherein the hardware processor is configured to generate, as the provisional signal table record, a record having the set of elements, the set of elements of the provisional signal table record including a number of vertical scanning lines and a horizontal scanning time of the image signal and further including elements of a record of the signal table, a number of vertical scanning lines and a horizontal scanning time of which are close to the number of vertical scanning lines and the horizontal scanning time of the image signal.

5. The display control device according to claim 1, wherein the hardware processor is configured to detect, as a left end pixel number for output, a number of dot clocks during a period from a horizontal synchronizing signal to first image data included in the image signal.

6. The display control device according to claim 2, wherein the hardware processor is configured to detect, as a left end pixel number for output, a number of dot clocks during a period from a horizontal synchronizing signal to first image data included in the image signal.

7. The display control device according to claim 3, wherein the hardware processor is configured to detect, as a left end pixel number for output, a number of dot clocks during a period from a horizontal synchronizing signal to first image data included in the image signal.

8. The display control device according to claim 4, wherein the hardware processor is configured to detect, as a left end pixel number for output, a number of dot clocks during a period from a horizontal synchronizing signal to first image data included in the image signal.

9. The display control device according to claim 5, wherein the hardware processor is configured to detect, as a right end pixel number for output, a number of dot clocks during a period from the horizontal synchronizing signal to last image data included in the image signal.

10. The display control device according to claim 9, wherein the hardware processor is configured to detect, as an upper end scanning line number for output, a number of dot clocks during a period from a vertical synchronizing signal to a horizontal synchronizing period including the first image data, included in the image signal.

11. The display control device according to claim 10, wherein the hardware processor is configured to detect, as a lower end scanning line number for output, a number of dot clocks during a period from the vertical synchronizing signal to the horizontal synchronizing period including the last image data, included in the image signal.

12. The display control device according to claim 11, wherein the hardware processor is configured to update a left end pixel number in the provisional signal table record to the left end pixel number for output, update a right end pixel number in the provisional signal table record to the right end pixel number for output, update an upper end scanning line number in the provisional signal table record to the upper end scanning line number for output, and update a lower end scanning line number in the provisional signal table record to the lower end scanning line number for output.

13. A display control method for controlling display of a non-standard image signal, the method being executed by a hardware processor of a display control device, and the method comprising:
   receiving an image signal;
   acquiring a feature of the image signal;
   generating a provisional signal table record in a case in which the acquired feature of the image signal is not stored in a record of a previously prepared signal table;
   detecting data for regulating an active display region of an image, from the image signal; and
   updating the provisional signal table record, based on the data which has been detected,
   wherein:
   the signal table is stored in a memory, each record of the signal table containing various data including data for regulating an active display region of an image of an image signal to which the record corresponds,
   each record of the signal table includes at least seven elements, and
   the signal table stores at least one record having a set of elements including at least a number of vertical scanning lines, a horizontal scanning time, a left end pixel number, a right end pixel number, an upper end scanning line number, a lower end scanning line number, and clock information.

14. A non-transitory computer-readable storage medium having a program stored thereon that, when executed by a hardware processor, controls the hardware processor to perform functions comprising:
   receiving an image signal;
   acquiring a feature of the image signal;
   generating a provisional signal table record in a case in which the acquired feature of the image signal is not stored in a record of a previously prepared signal table;
   detecting data for regulating an active display region of an image, from the image signal; and
   updating the provisional signal table record, based on the data which has been detected,
   wherein:
   the signal table is stored in a memory, each record of the signal table containing various data including data for regulating an active display region of an image of an image signal to which the record corresponds,
   each record of the signal table includes at least seven elements, and
   the signal table stores at least one record having a set of elements including at least a number of vertical scanning lines, a horizontal scanning time, a left end pixel number, a right end pixel number, an upper end scanning line number, a lower end scanning line number, and clock information.

15. A display control device comprising:
   a hardware processor configured to:
      receive an image signal;
      acquire a feature of the image signal;
      generate a provisional signal table record in a case in which the acquired feature of the image signal is not stored in a record of a previously prepared signal table;
      detect data for regulating an active display region of an image, from the image signal; and
      update the provisional signal table record, based on the data which has been detected,
   wherein the hardware processor is configured to detect, as a left end pixel number for output, a number of dot clocks during a period from a horizontal synchronizing signal to first image data included in the image signal,
   wherein the hardware processor is configured to detect, as a right end pixel number for output, a number of dot clocks during a period from the horizontal synchronizing signal to last image data included in the image signal, and
   wherein the hardware processor is configured to detect, as an upper end scanning line number for output, a number of dot clocks during a period from a vertical synchronizing signal to a horizontal synchronizing period including the first image data, included in the image signal.

* * * * *